Patented Aug. 29, 1933

1,924,253

UNITED STATES PATENT OFFICE 1,924,253

CONDENSATION PRODUCT FROM UREA AND AN ALCOHOL OR A KETONE AND PROCESS OF PREPARING THEM

Max Paquin, Konigstein-on-the-Taunus, Germany, assignor to I. G. Farbenindustrie Aktiengesellschaft, Frankfort - on - the - Main, Germany, a Corporation of Germany No Drawing. Application September 30, 1927, Serial No. 223,232, and in Germany October 4, 1926

6 Claims. (Cl. 260—2)

My present invention relates to condensation products from urea and an alcohol or a ketone and a process of preparing them.

It is known that urea or its derivatives when treated with an alcohol or a ketone, or a derivative thereof, are transformed into well-defined crystalline compounds.

Now I have made the surprising observation that when working under suitable conditions the reaction in question not only leads to the formation of the compounds above referred to, but in its further progress to the formation of amorphous products. These products may be of an oily or resinous character.

If, for instance, urea is treated with a compound containing hydroxyl, there is at first formed a urethane-like or allophanic acid ester like body which, owing to its property of readily crystallizing, can in most cases be easily isolated. However, if the heating is continued with an excess of alcohol, if required while adding a suitable catalyst and applying pressure, the quantity of urethane gradually diminishes and oily or resinous products are obtained.

The same products are obtained by conducting the reaction not in the heat, but at ordinary temperature while using a suitable catalyst, for instance a strong mineral acid.

The products in question may also be obtained by starting from urea derivatives as for instance thiourea or alkylated or acylated urea or the like or from the intermediate products which are formed during their preparation. If for instance urethane is treated with an appropriate alcohol, the same final products are obtained as those produced when starting from urea. Instead of an alcohol there may be used for the reaction a ketone or compounds as for instance an aldehyde-alcohol, and also such derivatives as contain besides the ordinary elements another element, for instance sulfur, nitrogen or halogen.

By using ketones in the reaction, similar amorphous compounds can be obtained.

Urea condensation products are accordingly obtained when causing to act upon each other a compound of the following constitution

wherein $R_1$ stands for oxygen or sulfur, $R_2$ for $NH_2$, NH-acyl, O-alkyl or O-aryl and a compound containing the following atomic group

—C—X wherein X stands for an alcoholic hydroxyl group or for the group

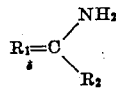

The amorphous condensation products obtainable by my new process, which appear to be substantially a mixture of alkylated urethanes and alkylated allophanic acid esters, are also water-soluble, if their alcohol content is water-soluble, and if for the starting material pure urea is used. However, if water-insoluble alcohols are acted upon with urea or water-soluble alcohols acted upon with water-insoluble urea derivatives, there are generally obtained water-insoluble products.

I have, furthermore, found that in the reaction of the two components there may also participate other substances not derived from urea but containing an amino group. They are simultaneously transformed by the reaction and similar amorphous, oily or resonous products are produced.

In the course of my researches, I have made the further observation that it is possible to prepare metal compounds from the above characterized oily or resinous reaction products. Certain metals, particularly the alkali metals or alkaline earth metals and also zinc, cadmium and similar metals, when introduced during or after completion of the reaction between the urea and alcohol or ketone, are dissolved with evolution of hydrogen and there are obtained in this manner products which are distinguished from those which are free from metal by the fact that their viscosity is extremely high. In many cases the solubility of the products in water is still improved by converting them into the corresponding metal compounds.

I have finally found that the cited products resulting from the reaction between the ureas and alcohols or ketones and also those obtained in presence of amino compounds not derived from urea or the metal compounds of these reaction products, can be brought to reaction with any aldehyde. When using formaldehyde for instance there are obtained, according to the duration, the intensity and the quantity of formaldehyde subjected to the reaction, amorphous products of a thick-liquid or resinous consistency.

The above described products can be used for a great variety of purposes, for instance they may be employed as softening agents for cellulose esters or cellulose ethers, moreover as natural or artificial (synthetic) resins of every kind and similar substances. In an analogous manner the products in question may be utilized for substances which swell up in water, in particular albuminous substances to be used for elastification and hardening purposes. Some of the products in question exercise a peculiar effect on lacquers from nitrocellulose, namely by preventing them from becoming gelatinized and assuming a green color which occurs when metal bronzes containing copper are present.

The following examples serve to illustrate my invention but they are not intended to limit it thereto, the parts being parts by weight.

(1) 139 parts of ethyl alcohol and 60 parts of urea are heated in a pressure vessel for 5 hours to 180° C. to 190° C. The resulting substantially oily product can be purified by distillation in vacuo and thus separated from the urethane and allophanic ester (portions) contained therein. It is soluble in water and organic solvents.

(2) 60 parts of urea are heated to boiling for 3 hours, while stirring, with 200 parts of benzyl alcohol and 6 parts of glycerine. In this manner the urethane first formed is converted into a viscous oil, which may be purified by distillation in a vacuum. It is readily soluble in organic solvents.

(3) 180 parts of methylcyclohexanol are kept boiling in a reflux condenser for 3 hours with 60 parts of urea. During this operation the temperature rises from 165° C. to 195° C. Thus, a thick-liquid oil is obtained which may be purified by filtration and distillation.

(4) 170 parts of triethanolamine are heated for 35 minutes to 250° C. with 60 parts of urea. The resulting mass is extremely viscous, light yellow, soluble in water and can be purified by vacuum-distillation.

(5) 468 parts of diacetine are boiled in a reflux apparatus for 1¼ hour with 102 parts of acetyl urea. The mixture is kept at a temperature of 165° C. for 4 hours, while stirring. The oily product thus obtained is soluble in water and can be purified by fractional distillation.

(6) 438 parts of lactic acid butyl ester are boiled in the reflux apparatus for three hours with 90 parts of urea. After filtration the reaction mixture is freed in a vacuum from the small portion of unattacked lactic acid ester it may contain and thus a thick-liquid oil is obtained which can be purified further by distillation.

(7) 315 parts of glycerinacetaldehydeacetal of the following formula:

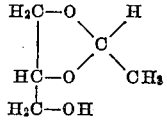

are boiled in a reflux apparatus for one hour with 120 parts of urea. The mixture is then heated for 8 hours to 175° C. while stirring. The product thus obtained is soluble in water and can be purified by fractional distillation.

(8) 240 parts of ethyleneglycol are mixed with 96 parts of thiourea while stirring and this mixture is kept at 190° C. to 200° C. After having continued this operation for 1½ hour, an oily product is obtained which is soluble in water and can be purified by fractional distillation.

(9) 244 parts of thiodiglycol are heated to boiling with 360 parts of urea for 1¼ hour while the temperature rises to 195° C. Thus a limpid, viscid resin is obtained which is soluble in alcohol.

(10) 445 parts of urethane are heated in an open vessel to 170° C. for 40–50 hours, while stirring, with 230 parts of glycerine. Thus there is formed an oily condensation product, which becomes gradually more and more viscous. After having expelled any volatile portions which may form in small quantity there is left a limpid resin which is soluble in water and organic solvents.

(11) 192 parts of 1.3-butyleneglycol are mixed, while stirring, with 120 parts of urea and 8 parts of concentrated sulfuric acid. During this operation the temperature gradually rises to 40° C. to 60° C. and a clear solution is obtained. After having stirred this solution for about 5 hours a viscous, oily product is formed. This product can be freed from the acid and purified in the usual manner.

(12) 118 parts of glycerinacetaldehydeacetal and 60 parts of urea are dissolved at about 50° C., while stirring, so as to obtain a clear solution. After having passed gaseous hydrogen chloride into the solution and after the expiration of 4 hours an oily product is obtained which can be purified in known manner.

(13) 360 parts of acetophenone, 60 parts of urea and 6 parts of glycerine are heated together to boiling, while stirring. The temperature rises during this operation from 185° C. to 205° C. and the initial two layers unite into a single layer with a slight elimination of ammonia. After 2 hour's duration the reaction is complete and a viscous oil is obtained which may be purified by fractional distillation.

(14) 327 parts of cyclohexanone are boiled for 1¼ hour with 200 parts of urea in a reflux apparatus fed with water of a temperature of 90° C. During this operation, the temperature rises to 260° C. to 270° C. The water vapours which evolve are condensed above the reflux apparatus by means of a descending condenser. The quantity of cyclohexanone which has passed off simultaneously is replaced by dropping about an equal quantity thereof into the reaction vessel. After cooling, a limped, light-yellow resin is obtained, which may be employed for a great variety of purposes.

(15) 200 parts of butyleneglycol are boiled for 2 hours in the reflux apparatus with 80 parts of urea and 60 parts of acetylaniline. During this operation the temperature rises from 204° C. to 232° C. Thus, a light, limpid oil is obtained which may be purified in known manner.

(16) 200 parts of methylcyclohexanol are boiled for 45 minutes in the reflux apparatus with 60 parts of urea and 70 parts of toluenesulfamide. During this operation the temperature rises from 165° C. to 220° C. In this manner a viscous oil is obtained.

(17) 180 parts of butyleneglycol are boiled in the reflux apparatus with 80 parts of urea and 5 parts of metallic calcium. During the reaction the metal dissolves with evolution of hydrogen and after 45 minutes a yellow viscous limpid oil is obtained.

(18) 200 parts of glycerinacetaldehydeacetal are boiled in the reflux apparatus with 80 parts of urea, 70 parts of toluenesulfamide and 5 parts of magnesium-metal powder. The metal dissolves with evolution of hydrogen and a highly viscous light yellow oil is obtained.

(19) 100 parts of the oily product obtained according to Example 8 from ethyleneglycol and thiourea are boiled in the reflux apparatus with 75 parts of formaldehyde of 30% strength until the smell of formaldehyde has become very weak, which is the case after about 6 hours. The water contained in the product is extracted and thus a very viscous, limpid mass is obtained which, when strongly heated, splits off formaldehyde.

(20) 100 parts of the oily product obtained according to Example 14, by the reaction of butyleneglycol with urea and toluenesulfamide, are mixed with 30 parts of para-formaldehyde and heated to 70° C. to 80° C. while stirring. After 4-5 hours, the reaction is complete and a clear extremely viscous mass is obtained which, on being strongly heated, splits off formaldehyde.

(21) 100 parts of the resin obtained according to Example 14 from cyclohexanone and urea are boiled for 6 hours in the reflux apparatus with 70 parts of formaldehyde of 30% strength. The water contained in the product is expelled and thus a limpid resin is obtained which can be used for technical purposes.

(22) 100 parts of the oily product obtained from glycol and urea are boiled in a reflux apparatus with 65 parts of benzaldehyde for 4 hours. The constituents unite with elimination of water. The oily benzyl compound thus obtained can be purified by vacuum distillation.

(23) 100 parts of the oily product obtained from benzyl glycol and urea are boiled in a reflux apparatus for 5 hours with 48 parts of crotonic aldehyde and 15 parts of anhydrous potassium bisulfate. Thereupon the pungent smell has disappeared and the resulting crotonic compound can be purified by vacuum distillation.

In the following claims the term "lower aliphatic alcohols" is intended to exclude the higher aliphatic alcohols such as sugar or starch.

I claim:
1. The process of preparing urea condensation-products, which consists in causing urea and an excess of a lower alcohol being free from aldehyde groups to act upon each other in boiling heat for a prolonged time until constantly oily or resinous products are obtained.

2. The process of preparing urea condensation-products, which consists in causing urea and an excess of methylcyclohexanol to act upon each other in boiling heat.

3. The process of preparing urea condensation-products, which consists in causing urea, an excess of methylcyclohexanol and toluenesulfamide to act upon each other in boiling heat.

4. As new products, urea condensation-products which are identical with those obtainable by the process set forth in claim 1, said products being of an oily or resinous character and suitable for being employed for instance as softening agents for cellulose-ethers or cellulose esters.

5. As new products, urea condensation-products which are identical with those obtainable by the process set forth in claim 2, said products being of an oily or resinous character and suitable for being employed for instance as softening agents for cellulose-ethers or cellulose-esters.

6. As new products, urea condensation-products which are identical with those obtainable by the process set forth in claim 3, said products being of an oily or resinous character and suitable for being employed for instance as softening agents for cellulose-ethers or cellulose esters.

MAX PAQUIN.